United States Patent [19] [11] 4,183,440

Wilkinson [45] Jan. 15, 1980

[54] EXTENSIBLE BOOM

[75] Inventor: Alvin H. Wilkinson, Talala, Okla.

[73] Assignee: Auto Crane Company, Tulsa, Okla.

[21] Appl. No.: 783,154

[22] Filed: Mar. 31, 1977

[51] Int. Cl.[2] ..... B66C 23/06

[52] U.S. Cl. ..... 212/55; 52/115; 52/223 R; 212/144; 254/135 R

[58] Field of Search ..... 212/55-57, 212/58 R, 54, 144; 52/114-122, 223 R; 254/135, 143

[56] References Cited

U.S. PATENT DOCUMENTS

| | | | |
|---|---|---|---|
| 2,999,600 | 9/1961 | Gates | 212/55 |
| 3,426,917 | 2/1969 | Siegel | 212/55 |
| 3,465,899 | 9/1969 | Reuter et al. | 212/55 |

*Primary Examiner*—Stephen G. Kunin
*Assistant Examiner*—R. B. Johnson
*Attorney, Agent, or Firm*—Head & Johnson

[57] ABSTRACT

An extensible boom, which comprises a first part which is pivotally anchored to a rotatable pedestal so that the boom may be raised or lowered. A second part of smaller lateral dimension is adapted to slide within the first part. The outer end of the second part carries a crown, with at least two crown sheaves. On the inner end of the second part there are two pulleys having transverse vertical pins about which they rotate. On the outer end of the first part there is a third pulley having a shaft substantially horizontal. A conventional cable drum is supported on the pedestal with conventional drive means. The cable spools from the drum over one of the crown shafts down to a travelling block and hook and is arranged over said pulleys in a manner such that when there is a weight hanging on the hook, there will be a force tending to extrude the second part out of the first part, unless it is held back by a tension member. This tension member comprises a long threaded rod, which is threaded through a nut on the inner end of the second part. The extension or withdrawal of the second part from the first part of the boom, is controlled by rotating the threaded rod in the nut.

3 Claims, 4 Drawing Figures

EXTENSIBLE BOOM

BACKGROUND OF THE INVENTION

1. Field of the Invention

This invention lies in the field of hoisting machinery, or cranes.

More particularly it concerns the design of extensible booms for cranes.

Still more particularly, it concerns the design of an extensible boom for a crane in which the extension of the two parts of the boom is controlled by a tension member, rather than a compression member, as in conventional designs.

2. Description of the Prior Art

In the prior art, extensible booms are made with at least two linear members, one of which is adapted to be guided and slide into and out of a second member, generally the outer of the two. The outer part of the boom is anchored at a rotatable pedestal by means of a horizontal shaft so that the boom can be raised and lowered by appropriate cable means.

In the prior art, the extension of the inner member of the beam, with respect to the outer member is generally by means of a hydraulic piston and cylinder in which the piston rod is of sufficient diameter and strength to operate as a compression member, in extending the inner part of the boom. This requires a rather costly and heavy mechanism for controlling the relative extension of the inner member with respect to the outer member.

SUMMARY OF THE INVENTION

It is a primary object of this invention to provide an extensible boom in which the relative extension of one part with respect to the other part of the boom is controlled by a tension member, rather than by a compression member.

These and other objects are realized and the limitations of the prior art are overcome in this invention by providing a boom having two parts; a first part which is the basic portion of the boom and is of larger transverse dimensions than the second part, which is adapted to slide within the first part. The base of the first part is hinged to a rotatable pedestal which is anchored to a large base or structure, so that the boom can be raised or lowered by appropriate cable and drum.

The second part, or the inner member of the boom, has a crown at its outer end, and includes at least two sheaves therein. A cable drum is provided on the pedestal and includes means to drive the drum. The cable unreels from the drum, passes over a first of the crown sheaves, down under a travelling block and hook, and up and over the second crown sheave.

On the inner end of the second part, there are two sheaves arranged with their axis substantially transverse to the second part and in a vertical plane. In the outer end of the first part there is a third sheave which has a horizontal axis.

The line returning from the travelling block which pases over the second crown sheave goes along the side of the boom, and around a first of the two sheaves mounted on the second part of the boom. The cable then moves outwardly along the side of the boom to and around the third sheave back along the side of the boom, around the second sheave in the inner end of the second part, and back out along the side of the boom to an anchor point, near the outer end of the first part of the boom.

With a tension in the cable, it will be clear that the cable passing over the first and second sheaves and around the third sheave will act to pull the sheaves together, namely to move the inner part of the boom outwardly.

With the two sheaves in the end of the inner part of the boom, there will be four lines tending to pull the second part out of the base portion of the boom, while there are two lines supporting a load hanging on the hook. Consequently, there will be a greater force tending to extrude the inner part of the boom, than the force caused by the pulling forces inwardly on the boom itself.

In order to prevent the outer extrusion of the second part of the boom, it is held back by a tension member which connects between the inner end of the second part, to the inner end of the first part. One convenient way of doing this is to provide a long threaded rod, or screw, which passes through an axial nut in the inner end of the second part. The threaded rod is anchored with a thrust bearing at the inner end of the first part, and carries a gear or sprocket so that it can be driven by a power source, selectively in one direction or the other, so as to position the nut on the second part at a selected distance along the base portion of the boom. The rod can be rather small in diameter since it is maintained in tension by the pull of the cables between the first, second and third sheaves.

When there is no load, or course, there is no tendency to compress the two parts of the boom so that the screw is not under compression or tension. Whenever there is a load on the hook, then the tension in the cable will cause the outward force on the second part of the boom due to the tension in the cable around the crown sheaves.

Since a tension member is all that is required, it can be a screw as has just been described, or it can be a hydraulic cylinder with a small diameter piston rod, which acts in tension, or it can be a cable. For example, a pair of multiple sheave blocks can be used with a hand winch or other means to control the position of the second part in respect to the first part of the boom.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 2:
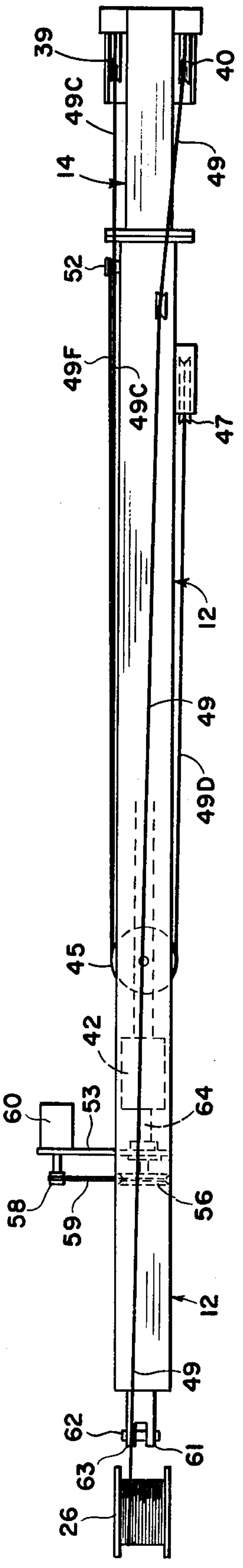
FIGS. 1 and 2 illustrate respectively elevation and plan views of the extensible boom of this invention.
Figure 1:
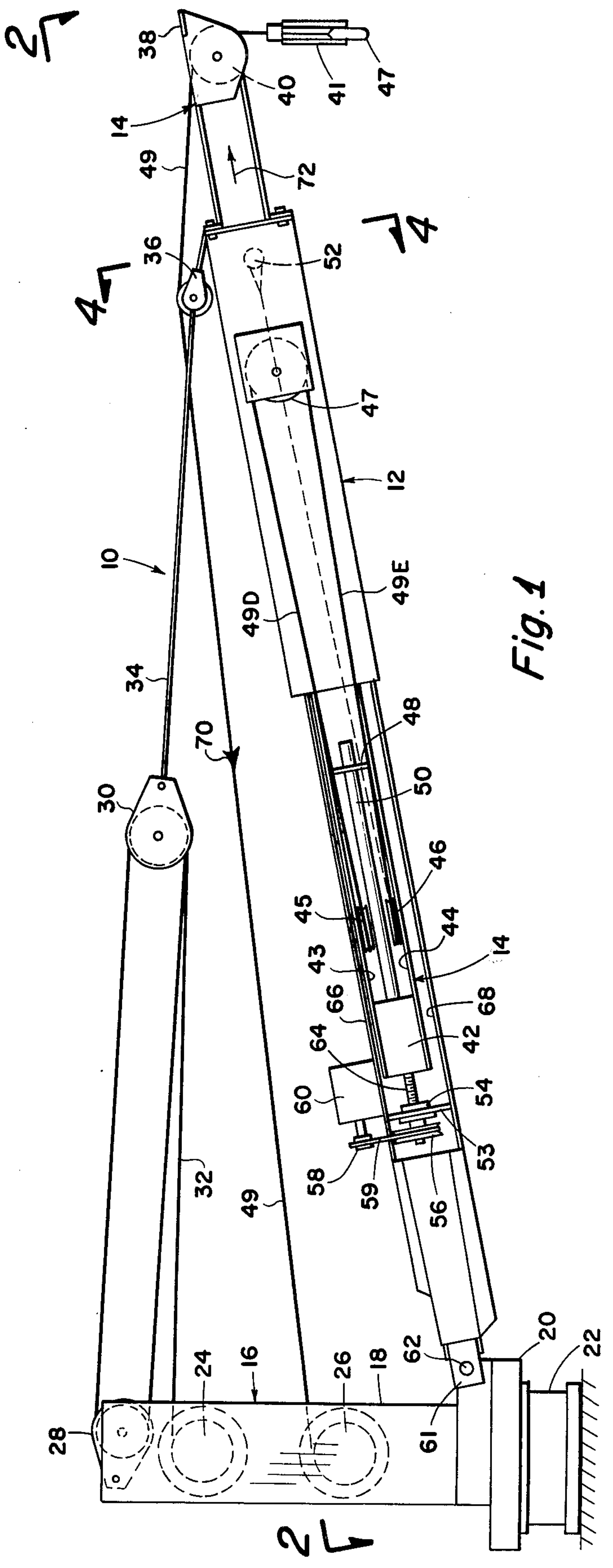
Figure 3:
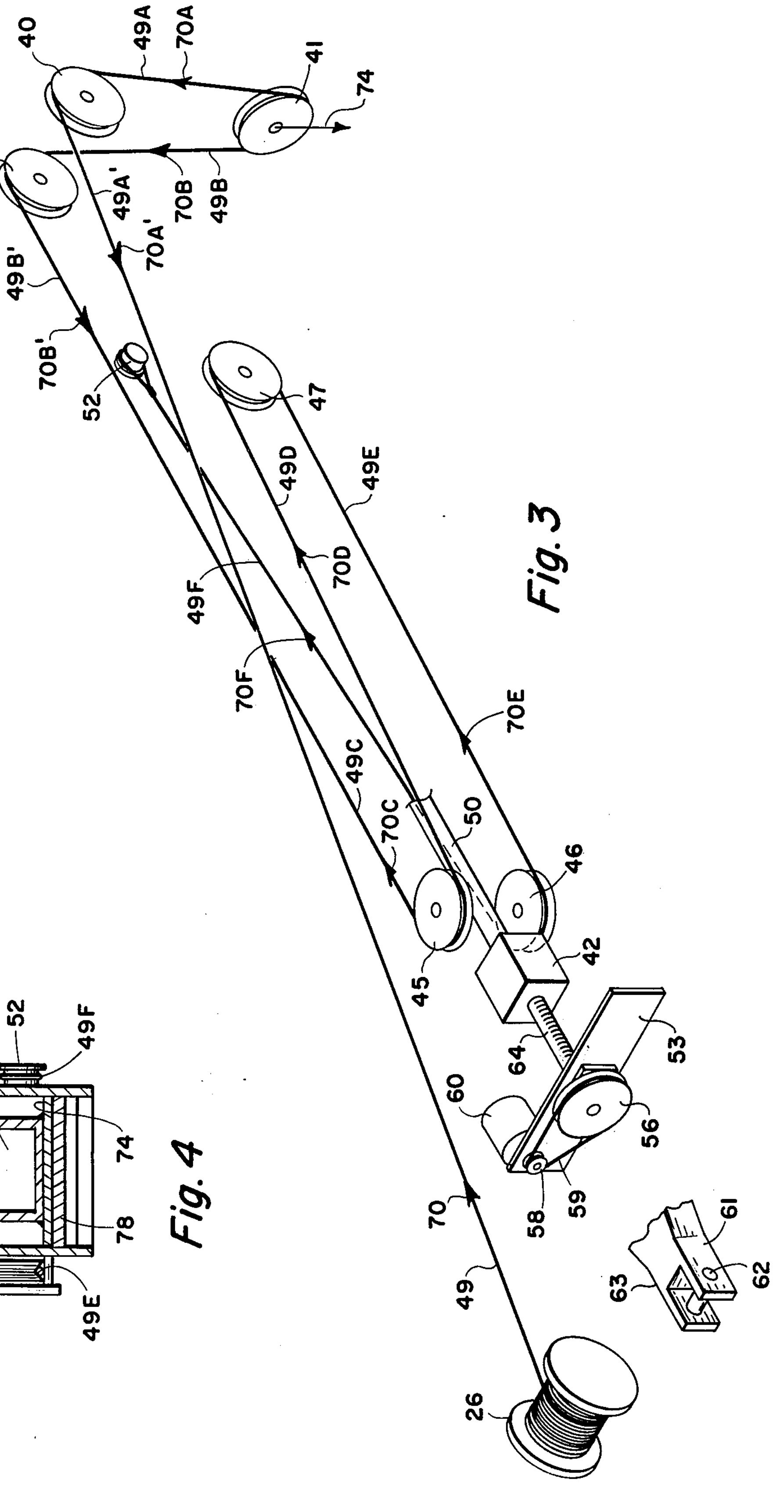
FIG. 3 illustrates the cable system of the invention.

Referring now to the drawings, and in particular to FIGS. 1, 2 and 3, there is shown one embodiment of this invention.

The boom of this invention is indicated generally by the numeral 10. It comprises two parts, a first part 12 which is the first, or outer, or basic part of the boom. There is a second part indicated generally by the numeral 14 which is adapted to slide into and along the axis of the first part 12.

The part 12 is hinged at its first end by means of a pin 62 which passes through two side members 61 and 63. The pin is journalled in the base of a pedestal indicated generally by the numeral 16, which has a bearing portion 20, which is supported by a base portion 22.

As in conventional booms, in which the boom is hinged so that it can be raised and lowered, a cable drum 24 is provided on the pedestal 16 which in combination with a pair of sheave blocks 30 and 28, and a tension member 34, if desired, which is anchored at 36 near the outer end of the first part of the boom. Rotation of the drum 24 then will raise or lower the boom as desired. This feature of the drum 24 and cable 32, sheaves 28 and 30 and members 34 and 36 form no part of the present invention.

Figure 4:
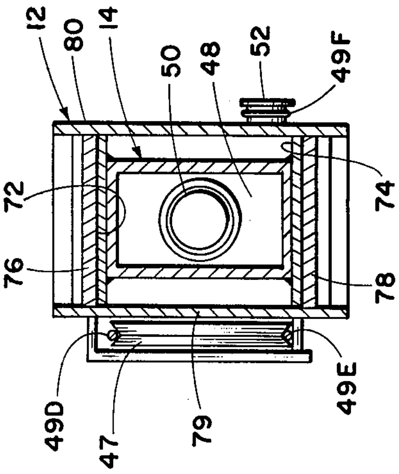
FIG. 4 illustrates a cross-section of the boom taken along the plane 4—4 of FIG. 1.

Referring for a moment to FIG. 4 which indicates the cross-section of both parts of the boom, the inner part 14 is a box section with upper and lower plates 72 and 74, which are adapted to slide on the inner surfaces of the plates 76 and 78 which are elements of the first part 12 of the boom. The outer portion of the first part 12 is a box section which includes the plates 76 and 78, and the side plates 79 and 80.

There is a winch drum 26 supported in the pedestal 16 that carries a cable or line 49. There is a crown 38 on the outer end of the second part 14, which carries two crown sheaves 39 and 40 which are substantially conventional, and there is a travelling block 41 which includes one sheave and a hook 47, both of which are conventional. At the first end of the second part 14, there are upper and lower plates 43 and 44, which are attached to a square or rectangular block 42, which has an axial threaded opening. Also there are two sheaves 45 and 46 which are mounted with their axes in a vertical plane.

At the inner end, or first end of the first part 12, there are again two supporting plates 66 and 68. There is a bulkhead 53 between these two plates, and in the center of the bulkhead there is a bearing 54 including a thrust bearing, which supports a threaded rod 64 of substantial length, equal to the range of extension desired between the first and second parts of the boom. This threaded rod 64, or screw, is locked in the bearing 54 and carries a drive member 56, which can be a pulley, chain sprocket, or gear, which matches the smaller member 58 which is driven by a motor 60, as is well known in the art. Thus, by closing an appropriate switch, the motor can be driven in one direction or another, and the threaded rod can be screwed into or out of the nut 42, and as it is rotated, the screw forces the nut outwardly or inwardly, and with it the second part of the boom.

On the side of the first part, near its outer end, there is a third sheave 47 mounted with its axis horizontal.

The cable 49 coming from the drum 26 passes over a first of the crown sheaves 40, down and under the travelling block 41, up and over the second crown sheave 39 along the side of the boom and around a first 45 of the two sheaves, then out along the side of the boom and around the third sheave 47, back along the boom and around the second sheave 46, where it goes out along the side of the boom to an anchor point 52.

Referring for a moment to FIG. 3, where there is illustrated the tension members of the system starting with the winch drum 26 and cable 49, the cable goes over the crown sheave 40, down as cable 49A and under the sheave 41 back up as cable 49B, over the sheave 39, back as cable 49C and around the sheave 45, then as cable 49D around the sheave 47, back as cable 49E around the sheave 46, and then back as cable 49F to the anchor point 52.

When there is a load indicated by arrow 74 on the sheave on the block 41, there will be tension in the cable indicated by 70A and 70B in the cable portions 49A and 49B and 70A′ and 70B′ in the cables 70A′ and 70B′. Tension in the cable 49 will be indicated as 70. This is the tension caused by the drum 26 and weight on the hook. There will be tensions 70C in the line 49C, 70D in the line 49D, 70E in the line 49E and 70F in the line 49F. Thus, it is seen that while the tension 70 is substantially equal to half of the force 74 on the hook, the force 72 (FIG. 1) tending to pull the second part out of the first part of the boom, which is exerted by the four cables 49C, 49D, 49E and 49F, each of approximately the same tension 70. Thus, irrespective of the fact that the tension in the cable 49 will tend to press the boom inwardly the effect of the four cables on the second part of the boom is to pull it out with a force greater than that exerted by the cable 49.

The only means for preventing this boom from being extruded is the tension exerted by the long screw 64 between the nut 42 and the anchoring bearing 54. Thus the positioning of the two parts of the boom can be done easily by rotating the screw 64, which can be relatively slender, since it is only operated in tension, and can be rotated by conventional means such as chain, gear or belt.

By using the main lifting cable 49, for the purpose of creating the tension in the member 64, there is no need for having an additional cable and drum. Since when there is no load on the hook there will be no tendency to extend or compress the screw 64. Thus, without any additional power equipment, the positioning means for locating one part of the boom with respect to the other is handled simply by means of a tension member which as illustrated as a long threaded rod or screw. In order to protect the screw, a long tube 50 can be provided from the block 42, and is supported in a bulkhead 48, for example.

Little detail is shown of the construction of the two parts of the boom since that design can be varied to suit conditions. The only point that must be remembered is that there must be means for getting the cable from the sheaves 45 and 46 out along the outside of the first part of the boom 12.

In conventional extensible booms, which for example, use a long hydraulic piston rod and cylinder, when the main lifting drum 26 is stationary, and the boom is extended, it will be clear that the cables 49A and 49B will be shortened and the travelling sheave 41 will be lifted up to the crown and may get tangled and broken with some considerable damage to the article being lifted by the hook. In the use of this invention, it will be clear that as the boom is extended, the cables joining the sheaves 45 and 46 to the rest of the apparatus will be shortened, and thus the travelling sheave 41 will be lowered and therefore there will be no interference.

In the illustrations of FIGS. 1, 2 and 3, the cable that provides the force between the first and second parts of the boom is actually the lifting cable. However, it is possible to provide a separate cable joining the sheaves 45, 46 and the sheave 47, the cable anchor 52, and a third cable drum, so that the extension of the boom can be controlled by the third cable drum with nothing more than the cables looped over the three sheaves. It is also clear that other configurations of the system can be provided in which the cable linking the sheaves 45, 46 and 47 can be the cable 32 which supports the boom itself, and so on.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. In a crane having an extensible boom, comprised of at least two coaxial parts one guidably inserted into the other, a first end of the outer part hinged about a horizontal axis at the base of a rotatable pedestal, the first end of the inner part inserted and guided into the second end of said outer part, the second end of said inner part carrying a crown structure including at least two sheaves, a travelling block and hook means positioned adjacent said crown structure;

the improvement in means to control the length of said at least two-part boom, comprising;

(a) at least two inner sheaves journalled near said first end of said inner part;

(b) said outer part having a rectangular box section with at least one third shevea with its axis perpendicular to one wall of said box section, near its second end;

(c) tension means of controllable length connected between the first ends of said outer and said inner parts;

(d) means to control the length of said tension means selectively, whereby said inner part will move axially outwardly or inwardly dependent on the operation of said means to control;

(e) winch means, including a lifting cable on a drum; said cable threaded over a first of said crown sheaves, down to said travelling block and hook, up and over the second of said crown sheaves, then inwardly parallel to said boom, around a first of said at least two inner sheaves, outwardly parallel to said boom and around said third sheave, inwardly parallel to said boom and around the second of said at least two inner sheaves, and outwardly parallel to said boom to an anchor point at said second end of said outer part.

2. The crane boom as in claim 1 in which said tension means comprises a screw means; said first end of the outer part provided with a bulkhead; said screw means including;

(a) an axially threaded nut in the first end of said inner part;

(b) a long screw inserted into said nut and journalled in said bulkhead; and (c) means to selectively rotate said screw.

3. The crane boom as in claim 1 in which said tension means comprises cable and sheave means.

* * * * *